US011477168B2

(12) United States Patent
Levin et al.

(10) Patent No.: US 11,477,168 B2
(45) Date of Patent: *Oct. 18, 2022

(54) DYNAMIC APPLICATION FIREWALL CONFIGURATION FOR CLOUD NATIVE APPLICATIONS

(71) Applicant: Palo Alto Networks, Inc., Santa Clara, CA (US)

(72) Inventors: Liron Levin, Kefar Sava (IL); Isaac Schnitzer, Ra'anana (IL); Elad Shuster, Petach Tikva (IL); Ory Segal, Tel Aviv (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,522

(22) Filed: Dec. 30, 2021

(65) Prior Publication Data

US 2022/0182360 A1    Jun. 9, 2022

Related U.S. Application Data

(63) Continuation of application No. 17/111,733, filed on Dec. 4, 2020, now Pat. No. 11,228,565.

(51) Int. Cl.
*H04L 9/40* (2022.01)
*H04L 67/10* (2022.01)
*H04L 67/02* (2022.01)

(52) U.S. Cl.
CPC ............ *H04L 63/029* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,043,893 B1 | 5/2015 | Benson et al. | |
| 10,931,695 B2 | 2/2021 | Plonka et al. | |
| 10,965,686 B1 * | 3/2021 | Agarwwal | ............ H04L 63/102 |
| 11,226,807 B1 * | 1/2022 | Katz | ........................ H04L 67/10 |
| 2015/0172300 A1 * | 6/2015 | Cochenour | ......... G06F 21/6218 726/23 |
| 2019/0312899 A1 * | 10/2019 | Shulman | ............... H04L 63/029 |

(Continued)

*Primary Examiner* — Quang N Nguyen
(74) *Attorney, Agent, or Firm* — Gilliam IP PLLC

(57) ABSTRACT

To dynamically determine and apply WAF protections for an application deployed to the cloud, exposed entities, are identified. The identified entities are further evaluated to determine whether the application is eligible for WAF protection based on whether the application uses a protocol that is compatible with WAF protection. If the application is eligible for WAF protection, after instantiating a WAF, WAF protections that should be enabled or disabled are determined based on characteristics of the application that are identified at runtime. The WAF can then be configured based on the identified protections such that those which are pertinent to the application will be enabled, while those which are not applicable to the application and thus will not be used are disabled. As a result, security provided by the WAF for a cloud application is tailored to the application based on information about the application gathered in the cloud deployment environment.

19 Claims, 5 Drawing Sheets

(56) References Cited

U.S. PATENT DOCUMENTS

| | | | |
|---|---|---|---|
| 2019/0334859 A1* | 10/2019 | Kannan | H04L 61/5014 |
| 2020/0177549 A1 | 6/2020 | Barton et al. | |
| 2021/0036991 A1 | 2/2021 | Owens et al. | |
| 2021/0055927 A1* | 2/2021 | Sarukkai | G06F 8/71 |
| 2021/0218771 A1* | 7/2021 | Khouderchah | H04L 63/20 |

* cited by examiner

DYNAMIC APPLICATION FIREWALL CONFIGURATION FOR CLOUD NATIVE APPLICATIONS

BACKGROUND

The disclosure generally relates to electric digital data processing and to security arrangements for protecting computers, components thereof, programs or data against unauthorized activity.

Attacks which target application layer processes are referred to as application layer attacks. Application programming interfaces (APIs), for instance, are a common attack vector for carrying out application layer attacks against applications. To protect an application against application layer attacks, the application and its API can be secured through deployment of an application firewall, or in the case of web applications, a web application firewall (WAF). WAFs provide applications with protection against application layer attacks which exploit vulnerabilities. For instance, a WAF deployed in front of a web application can enforce rules for blocking inbound Hypertext Transfer Protocol (HTTP) traffic. For web applications running in a cloud environment, cloud-based WAFs can be deployed for protection against application layer attacks. Cloud applications differ from traditional software applications in that the applications are hosted in the cloud rather than locally and can be accessed via the Internet. Due to the growing trend towards cloud computing, applications are commonly developed to be cloud native, or designed to be run in a cloud environment. Cloud native applications, which can be composed of loosely coupled services/microservices, are containerized applications designed for deployment to nodes of a cloud cluster on which the application will run.

BRIEF DESCRIPTION OF THE DRAWINGS

Embodiments of the disclosure may be better understood by referencing the accompanying drawings.

DESCRIPTION

Figure 1:
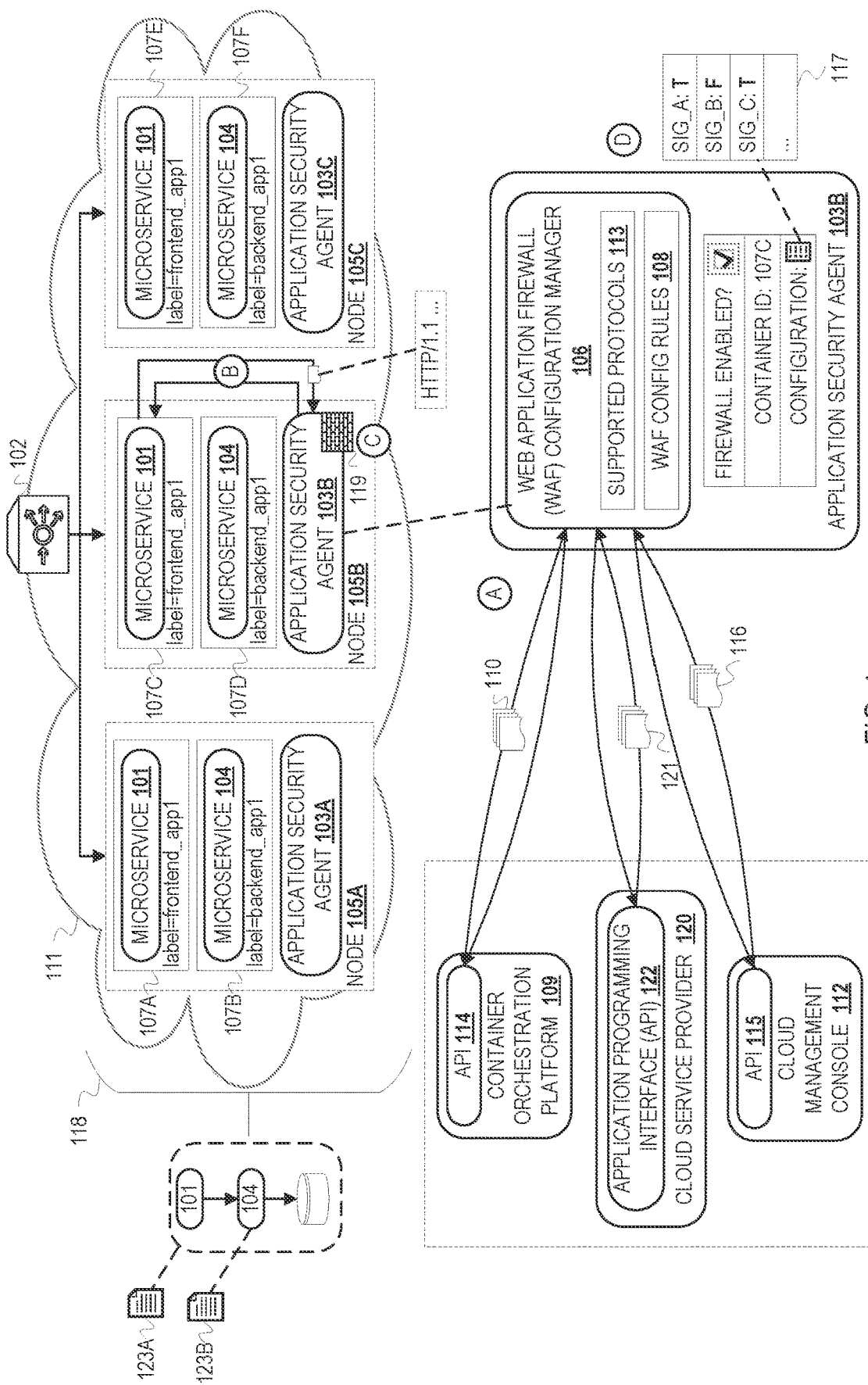
FIG. 1 depicts an example conceptual diagram of dynamically deploying and configuring a WAF based on characteristics of a cloud application being secured.

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

Overview

The architecture of cloud native applications (hereinafter simply "applications") introduces new complexities to the task of WAF deployment due to the potentially large number of entities that communicate via APIs and may be deployed to different nodes of a cloud cluster. DevOps engineers managing deployment of such applications to the cloud may lack the knowledge of the specific application containers which should be designated for firewall protection or which applications do not need firewall protection at all due to varying security needs across applications. Additionally, firewall rules for securing an application with a WAF are conventionally written manually. DevOps engineers may be further unaware of the specific protections (e.g., signatures and/or firewall policies) that should be enabled for different applications, and enabling all firewall protections can reduce performance due to the overhead resulting from enabling of protections that are not pertinent to the application and thus are not used.

Disclosed herein are techniques to simplify deployment and configuration of a WAF to secure an application running in a cloud while maintaining optimal performance by customizing WAF security based on runtime insights about the application. Firewall security can be considered to be customized to the application because enabling of specific protections offered by the WAF is automated based on information about the application gathered after its deployment, such as application type and topology. The gathered application information therefore informs determinations about the specific protections that are pertinent to the application and should be enabled to provide the appropriate protections without hindering performance. A protection is pertinent to the application if monitored traffic having malicious content could potentially match a corresponding signature, prompt a corresponding policy to be applied, etc. Tailoring WAF protections to the application being secured as opposed to enabling all WAF protections by default also reduces the scope of signatures and rules against which the WAF will evaluate incoming traffic, which can reduce false positive detections by the WAF as a result of removing threat categories that are not pertinent to the application from consideration.

To dynamically determine and apply WAF protections for an application deployed to the cloud, exposed entities, or the first entities (e.g., containers) within a cloud cluster on which the application runs to which requests originating from outside the cloud cluster are directed, are identified. Exposed entities can be identified based on the configuration of the cloud environment and/or network runtime topology information. The identified entities are further evaluated to determine whether the application is eligible for WAF protection, where eligibility can be determined based on whether the application uses a protocol that supports or is compatible with WAF protection (e.g., HTTP). If the application is eligible for WAF protection, after instantiating a WAF for the application, WAF protections that should be enabled or disabled are determined based on characteristics of the application that are determined at runtime. The WAF can then be configured based on the identified protections such that those which are pertinent to the application will be enabled, while those which are not applicable to the application and thus will not be used are disabled. As a result, security provided by the WAF for a cloud application is tailored to the application based on information about the application gathered in the cloud deployment environment.

Example Illustrations

FIG. 1 depicts an example conceptual diagram of dynamically deploying and configuring a WAF based on characteristics of a cloud application being secured. In this example, a cloud native application comprises frontend and backend tiers, or a frontend microservice 101 and backend microservice 104 (collectively the "microservices 101, 104"). As used herein, "cloud native application" refers to an application comprised of one or more containerized microservices to be run in a cloud. Three instances of each of the microservices 101, 104 are deployed to a cloud 111 and run on a cloud cluster 118. The cloud cluster 118 includes three nodes—node 105A, node 105B, and node 105C. The cloud 111 may be a public cloud, private cloud, or private cloud offered by a cloud service provider 120. The nodes 105A-C may be physical machines or virtual machines which provide the resources for running containerized applications in the cloud 111 (e.g., a container runtime). A cloud load balancer 102 distributes traffic between the nodes 105A-C. Instances of the frontend microservice 101 can be exposed externally to the cloud load balancer 102 via a frontend service configuration 123A indicating that traffic communicated to the application frontend should be routed to containers labelled as "frontend_app1." Similarly, the backend microservice 104 can be exposed internally to entities within the cloud cluster 118 with a backend service configuration 123B indicating that traffic communicated to the application backend should be directed to containers labelled as "backend_app1."

Each instance of the microservices 101, 104 is packaged in a respective container. On the node 105A, microservices 101, 104 are packaged in container 107A and container 107B, respectively. On the node 105B, microservices 101, 104 are packaged in container 107C and container 107D, respectively. On the node 105C, microservices 101, 104 are packaged in container 107E and container 107F, respectively. The containers 107A-F each comprise program code of the respective one of the microservices 101, 104, libraries used by the respective ones of the microservices 101, 104, etc. A container orchestration platform 109 manages container orchestration for the application deployment comprising the containers 107A-F.

An application security agent (hereinafter "agent") executes on each of the nodes 105A-C. Specifically, an agent 103A executes on the node 105A, an agent 103B executes on the node 105B, and an agent 103C executes on the node 105C. A cloud management console 112 provides a central management interface for the cloud cluster 118 with which the agents 103A-C can communicate. The agent 103B includes a WAF configuration manager 106. Although FIG. 1 depicts the agent 103B in additional detail for clarity, the agents 103A, 103C should be understood to include respective instances of a WAF configuration manager. Subsequent operations and functionality depicted in FIG. 1 are described in reference to the agent 103B executing on the node 105B for clarity; however, the agents 103A, 103C can perform similar operations and provide similar functionality as described herein.

FIG. 1 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the WAF configuration manager 106 identifies exposed microservices running on the node 105B. Exposed microservices are those which can first receive requests originating outside of the cloud cluster 118 and thus may be candidates for WAF protection. Based on the configuration of services within the cloud cluster 118 denoted by the frontend and backend service configurations 123A, 123B, the frontend microservice 101 is exposed in this example because requests received from outside of the cloud cluster 118 can be directed to the frontend microservice 101 as a result of the frontend service configuration 123A indicating that load balanced traffic should be directed to containers with the label "frontend_app1," such as the container 107C. Exposed microservices can be determined based on configuration data and/or metadata associated with the cloud cluster 118 indicating the containers to which the cloud load balancer 102 distributes traffic (e.g., the frontend and backend service configurations 123A, 123B) and/or information about network topology of the entities (e.g., containers) within the cloud cluster 118 from which the microservices receiving traffic from an Internet Protocol (IP) address external to the cloud cluster 118 can be identified.

The WAF configuration manager 106 can obtain cloud configuration information 110 from the container orchestration platform 109 via an API 114 offered by the container orchestration platform 109 and/or cloud configuration information 121 from the cloud service provider 120 via an API 122 offered by the cloud service provider 120. The cloud configuration information 110, 121 may be one or more configuration files and/or other data/metadata indicating a configuration of the cloud cluster 118 and the containers 107A-F deployed therein, such as the frontend and backend service configurations 123A, 123B. The WAF configuration manager 106 may also obtain network topology information 116 from the cloud management console 112 via an API 115 exposed by the cloud management console 112. The network topology information 116 indicates traffic routed to and within the cloud cluster 118 at runtime and may represent a directed graph that reflects direction and flow of traffic. The WAF configuration manager 106 can then determine that the frontend microservice 101 and corresponding container 107C are exposed based on analysis of the cloud configuration information 110, 121 and/or the network topology information 116 and identifies the container 107C and corresponding frontend microservice 101 as a candidate for WAF protection.

At stage B, the WAF configuration manager 106 determines a communication protocol used for communicating requests to the frontend microservice 101 and whether the communication protocol is compatible with WAF protection. The WAF configuration manager 106 first determines a port used by the frontend microservice 101. The port used by the frontend microservice 101 can be determined based on inspection of network interface information of the corresponding container 107C to identify an indication of the port number used for the container 107C. As another example, the WAF configuration manager 106 can determine the port number that corresponds to the container 107C based on submission of a query or request to the container orchestration platform 109 via its API 114 and/or to a container runtime installed on the node 105B via an API of the container runtime.

The WAF configuration manager 106 may maintain supported protocols 113 indicating a list of supported protocols that are compatible with WAF protection (e.g., HTTP or Hypertext Transfer Protocol Secure (HTTPS)), one or more policies or rules for determining communication protocol and if the protocol is compatible with WAF protection based on a response/communication received from cloud application components, etc. To determine the communication protocol, the WAF configuration manager 106 can submit a request or query to the frontend microservice 101 based on the port number used for the container 107C and analyze the response to determine if the protocol corresponds to one of the supported protocols 113. For instance, the WAF configuration manager 106 can submit an HTTP request to the base Uniform Resource Locator (URL) associated with the frontend microservice 101 that does not modify application resources (e.g., an HTTP OPTIONS request). In this example, the WAF configuration manager 106 verifies that the frontend microservice 101 uses HTTP based on a response to the submitted HTTP request, and the frontend microservice 101 is thus compatible with WAF protection.

At stage C, the WAF configuration manager 106 instantiates a WAF 119 in front of the frontend microservice 101. For instance, the WAF configuration manager 106 can instantiate the WAF 119 by enabling firewall protections offered by the agent 103B for the container 107C. The WAF 119 can be implemented as part of functionality of the agent 103B (e.g., as a process that executes as part of the agent 103B). Instantiation of the WAF 119 designating the container 107C can trigger installation of rules for routing traffic such that traffic with a destination address corresponding to an IP address associated with the container 107C is instead routed to the agent 103B for inspection by the WAF 119 (e.g., via creation of iptables rules). The agent 103B therefore can be considered to act as a proxy by which requests communicated to the frontend microservice 101 can be blocked or allowed based on security policies enforced by the WAF 119. The WAF 119 may be instantiated with a default configuration corresponding to a minimum set of protections that can facilitate securing the microservices 101, 104 running on the node 105B irrespective of the specific qualities of the microservices 101, 104 (e.g., type, programming language, etc.).

At stage D, the WAF configuration manager 106 configures protections of the WAF 119 to be applied in a WAF configuration 117 based on various characteristics of the multitiered application comprising the microservices 101, 104. The WAF configuration manager 106 maintains WAF configuration rules ("rules") 108 that indicate rules for enabling additional protections for the WAF 119 (i.e., those disabled by default upon instantiation of the WAF 119). Each of the rules 108 may indicate a protection which can be enabled for the WAF 119 (e.g., a signature, policy, etc.) and a condition(s) for enabling the protection. Conditions indicated in the rules 108 can be satisfied by characteristics of the microservices 101, 104 determined at runtime by the agent 103B. For instance, the agent 103 may obtain data/metadata about the microservices 101, 104 during their execution from which characteristics such as programming language, application types, etc. can be determined. The WAF configuration manager 106 may also leverage the cloud configuration information 110, 121 and network topology information 116 for identifying characteristics to be evaluated against the rules 108. The WAF configuration manager 106 determines if one or more of the rules 108 are satisfied by the determined characteristics and, if so, enables the corresponding protections for the WAF 119 in the WAF configuration 117. As an example, the rules 108 may indicate that if a cloud application accesses a relational database, the WAF 119 should be configured to monitor for signatures pertaining to SQL injection. Upon determining that the backend microservice 104B uses a relational database management system (e.g., based on identifying connectivity to a relational database in the network topology information 116), the WAF configuration manager can enable signatures for SQL injection for the WAF 119 accordingly.

Although the example in FIG. 1 describes the WAF configuration manager 106 as enabling protections for a WAF, such as in addition to a default set of protections enabled upon instantiation of the WAF, in other examples, the WAF may both disable and enable protections. For instance, with reference to FIG. 1, the WAF configuration manager 106 may determine that a first of the protections enabled for the WAF by default may not be needed for securing a particular cloud application (e.g., based on determining that one or more signatures are not applicable to a language in which the cloud application is written). In these instances, the WAF configuration manager 106 may disable the identified protections. Dynamic disabling of WAF protections may be done as an alternative or in addition to enabling of WAF protections by the WAF configuration manager 106.

Figure 2:
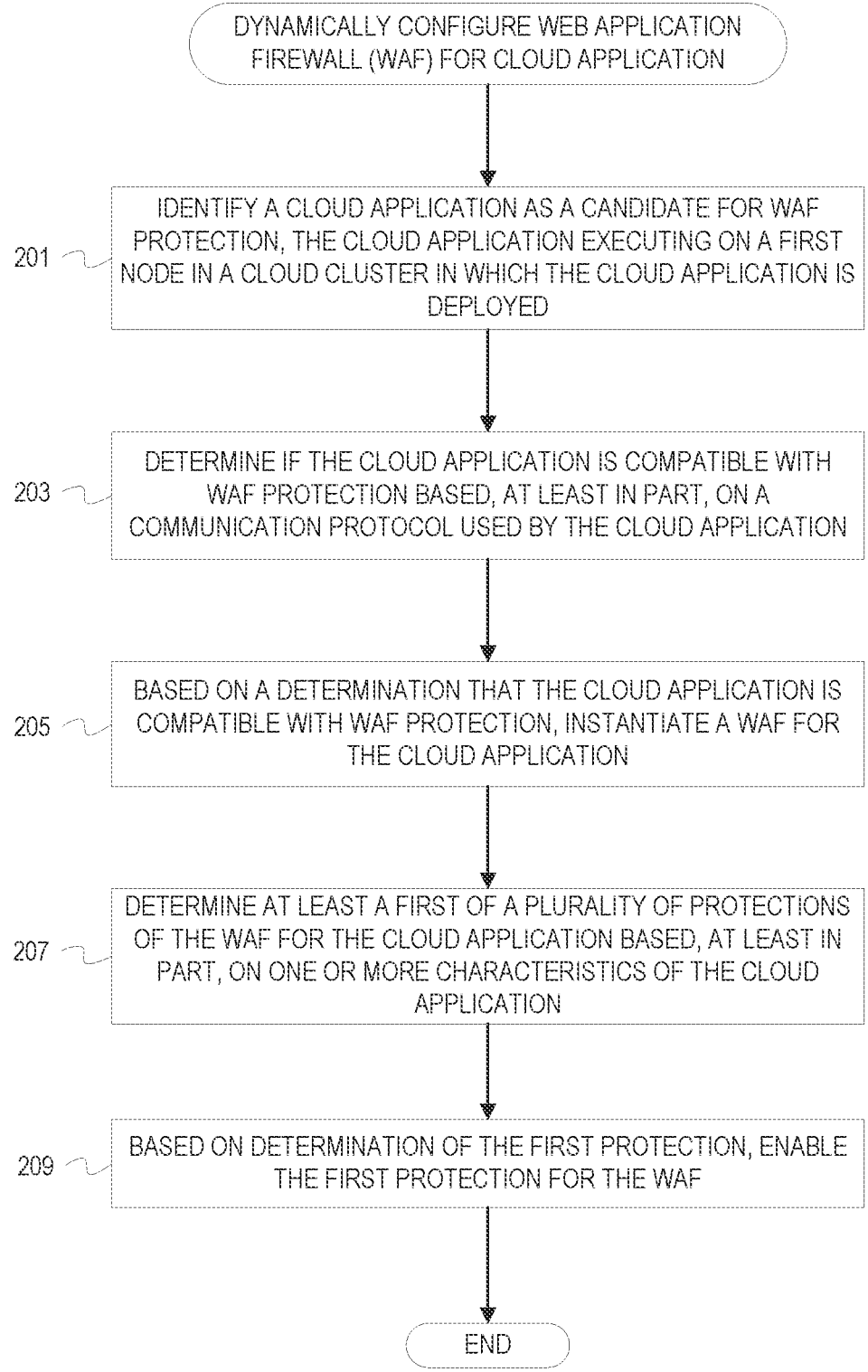
FIG. 2 depicts a flowchart with example operations for dynamically configuring a WAF for a cloud application.
Figure 3:
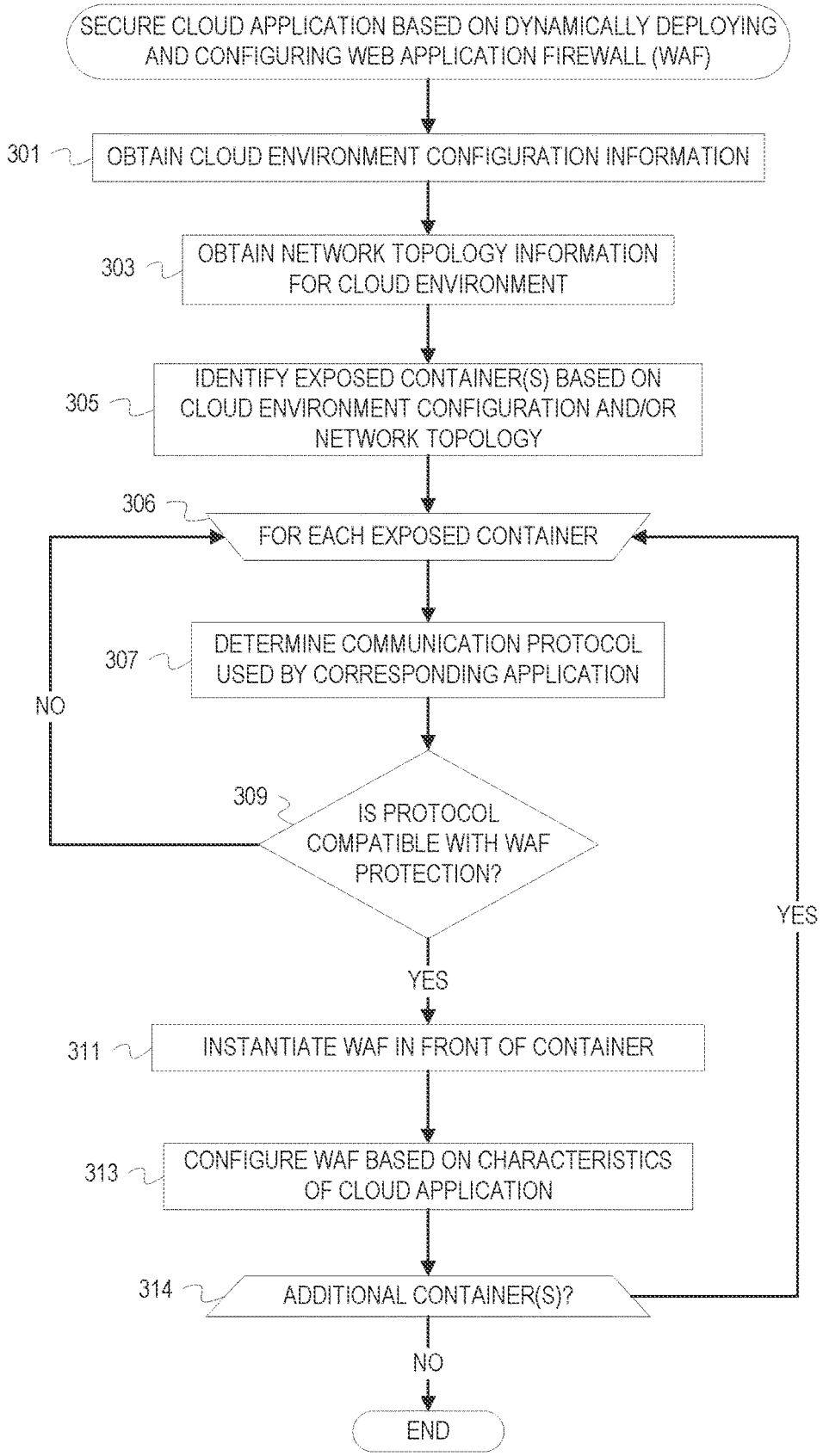
FIG. 3 depicts a flowchart with example operations for securing a cloud application based on dynamically deploying and configuring a WAF.
Figure 4:
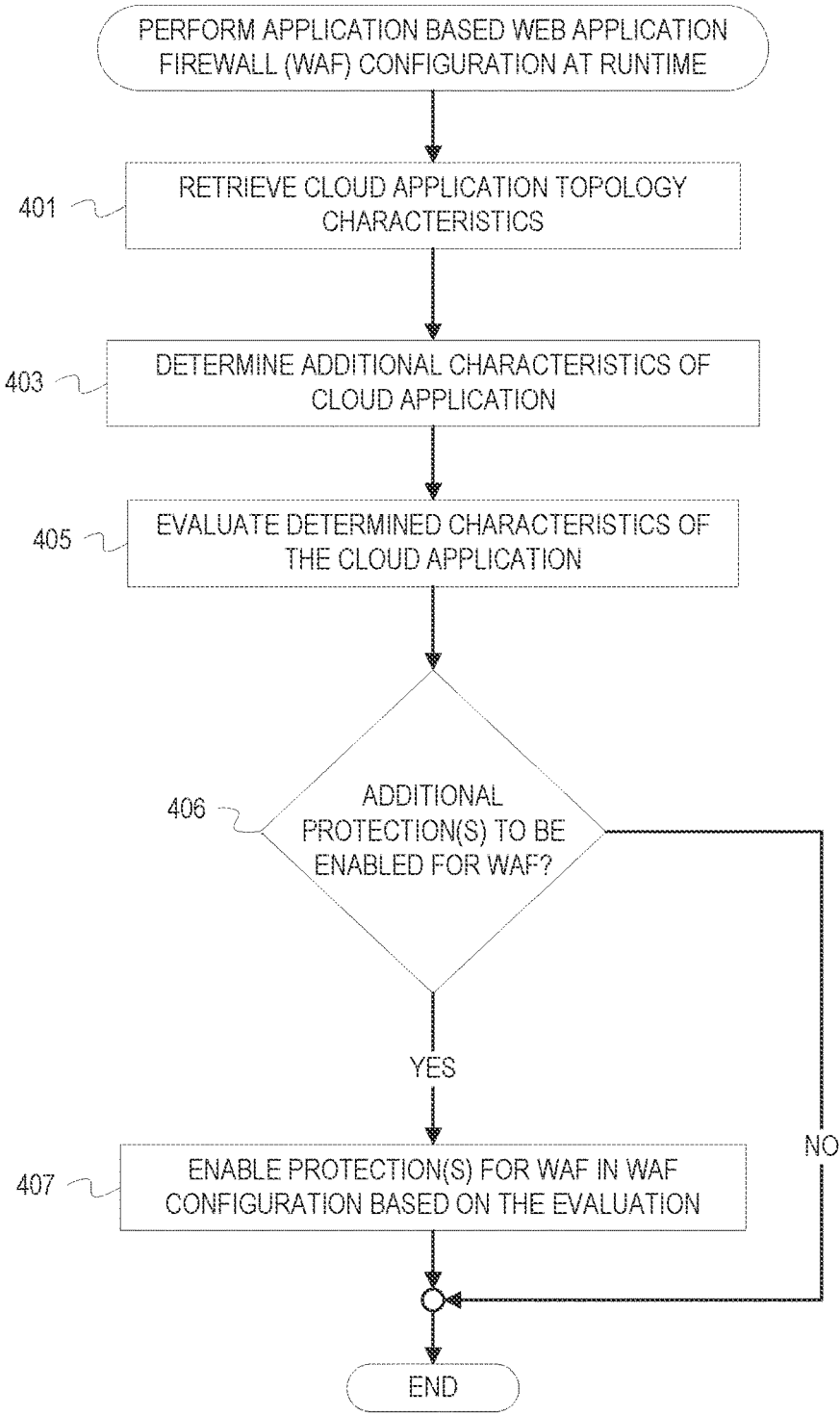
FIG. 4 depicts a flowchart with example operations for performing application based WAF configuration at runtime.

FIGS. 2-4 are flowcharts corresponding to example operations of a WAF configuration manager for dynamically deploying and configuring a WAF to secure a cloud native application (hereinafter simply "cloud application"). As described above, cloud application refers to an application comprised of one or more containerized microservices running in a cloud. The example operations are described with reference to a WAF configuration manager for consistency with FIG. 1, where the WAF configuration manager can execute on an agent deployed to a node of a cloud cluster on which the cloud application runs. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 depicts a flowchart with example operations for dynamically configuring a WAF for a cloud application. The example operations can be performed by the WAF configuration manager which executes on an agent that has been deployed to a node within a cloud cluster on which one or more containers of the cloud application also run.

At block 201, the WAF configuration manager identifies a cloud application as a candidate for WAF protection. Cloud applications executing on the first node can be identified as candidates for WAF protection if the cloud applications are exposed. The WAF configuration manager can identify cloud applications that are exposed based on identifying those which are exposed to a load balancer that routes network traffic to applications running on the first node, such as based on data and/or metadata about a configuration of the cloud cluster (e.g., configuration files defining exposure of applications as services). Alternatively or in addition, the WAF configuration manager can identify exposed cloud applications based on determining those which receive network traffic from sources external to the cloud cluster based on network topology information obtained for the cloud cluster.

At block 203, the WAF configuration manager determines if the cloud application is compatible with WAF protection based, at least in part, on a communication protocol used by the cloud application. The WAF configuration manager can determine the communication protocol by the cloud application by submitting a request or query to the cloud application that does not modify application resources and evaluate a response to the request or query, for example. The WAF configuration manager then can determine if the communication protocol is compatible with WAF protection, such as based on determining if the communication protocol is HTTP or HTTPS.

At block 205, based on determining that the cloud application is compatible with WAF protection, the WAF configuration manager instantiates a WAF for the cloud application. The WAF can be instantiated via the agent. As a result of instantiating the WAF via the agent, network traffic destined for the cloud application will be redirected to the agent for inspection based on WAF rules, policies, etc. (e.g., based on creation of iptables rules).

At block 207, the WAF configuration determines at least a first protection of a plurality of protections of the WAF for the cloud application based, at least in part, on one or more characteristics of the cloud application. Characteristics of the cloud application can include a type, topology, programming language, and/or resources accessed by the cloud application, for example. The WAF configuration manager may determine the characteristic(s) based on cloud application data/metadata obtained (e.g., by the agent on which the WAF configuration manager executes) during its execution. The determined characteristic(s) can then be evaluated against one or more rules for enabling WAF protections (e.g., signatures and/or policies), where each rule indicates a protection offered by the WAF and characteristics that satisfy a condition for enabling that protection for the WAF instantiated for the cloud application.

At block 209, based on determining the first protection, the WAF configuration manager enables the first protection for the WAF. The WAF configuration manager can enable the protection by applying a firewall rule/policy that designates or corresponds to the protection, modify a configuration of the WAF, etc.

FIG. 3 depicts a flowchart with example operations for securing a cloud application based on dynamically deploying and configuring a WAF. The example operations are described in reference to a WAF configuration manager which executes on an agent deployed to a node within a cloud cluster on which at least a first cloud application runs.

At block 301, the WAF configuration manager obtains cloud environment configuration information. Cloud environment configuration information may include one or more configuration files, data/metadata, etc. that are maintained by a cloud service provider offering the cloud in which the cloud application runs. Alternatively or in addition, the obtained cloud environment configuration information can include configuration files, data/metadata, etc. maintained by a container orchestration platform used for the cloud application, such as configuration files for related containers to be exposed as a service. The cloud environment configuration information may be indicative of connectivity of entities such as containers running on the node to entry points of the cloud application (e.g., based on exposure of containers to a load balancer) and thus reflect exposed entities of the cloud application. The WAF configuration manager can obtain the cloud environment configuration information from the cloud service provider and/or the container orchestration platform via APIs exposed by each of the respective sources.

At block 303, the WAF configuration manager obtains network topology information for the cloud environment. Network topology information includes information about the flow of network traffic to and within the cloud cluster on which the cloud application runs. For instance, the network topology information can indicate the flow and direction of traffic to and between containers of the cloud application. The network topology information may be maintained by a cloud management console (e.g., a central entity by which the cloud cluster can be managed) which provides an interface with which the WAF configuration manager can communicate to retrieve and provide information about the cloud application and cloud cluster on which it runs, including network topology. The WAF configuration manager can obtain the network topology information from the cloud management console via an API exposed by the console.

At block 305, the WAF configuration manager identifies whether one or more containers running on the node are exposed based on the obtained cloud environment configuration information and/or the network topology information. Exposed containers are those which can receive requests from outside of the cloud cluster. Exposed containers can be identified based on identifying the container(s) that are exposed to the load balancer. For example, configuration files corresponding to the cloud cluster and/or containers running on the node (e.g., those obtained at block 301) may indicate connectivity of containers to the load balancer. In particular, the WAF configuration manager can determine a label(s) or other key/value pair(s) associated with the destination container(s) to which a load balancer external to the cloud cluster should direct received traffic, such as based on configuration files designating the configuration of containers running on the node and/or of the load balancer. The WAF configuration manager can then obtain indications of the container(s) having the label(s) or key/value pair(s) specified by the load balancer configuration by submitting a query indicating the specified information to the container orchestration platform (e.g., via an API offered by the platform). Alternatively or in addition, exposed containers can be identified from analysis of the network topology information based on identifying the container(s) indicated as a destination IP address for received traffic having a source IP address that is external to the cloud cluster. The WAF configuration manager flags any exposed container(s) identified from the analysis of the cloud environment configuration information and/or the network topology information as a candidate for deployment of a WAF.

At block 306, the WAF configuration manager iterates over each of the exposed containers. In particular, the WAF configuration manager iterates over the externally exposed containers identified for the node on which the WAF configuration manager executes.

At block 307, the WAF configuration manager determines a communication protocol used by the application (e.g., microservice) corresponding to the container. Because the container is exposed and can thus receive requests from outside of the cloud cluster, the corresponding application may comprise a client-facing application (e.g., a web application). The WAF configuration manager may determine the communication protocol by determining if the application uses HTTP or HTTPS for sending/receiving requests. The WAF configuration manager can first determine a port used by the application based on network interface information of the container and/or submission of a query to the container orchestration platform or container runtime via a respective API. The WAF configuration manager can determine the communication protocol based on submission of a request or query to the application. The request or query submitted to the application should be a request or query which does not modify application resources and may indicate the port number determined to correspond to the container. For instance, the WAF configuration manager can obtain metadata of the process associated with the executing application and/or configuration data/metadata of the application and evaluate the obtained data/metadata to determine if the application uses HTTP. As another example, the WAF configuration manager can submit an HTTP OPTIONS request to a base URL associated with the application to determine if the application uses HTTP/HTTPS (e.g., based on the received response to the request). The communication protocol can also be determined through analysis of network traffic sent to the application by temporarily enabling port mirroring or packet sniffing. For instance, packets can be forwarded to the WAF configuration manager by using port mirroring for examination of the packets to determine the associated communication protocol.

At block 309, the WAF configuration manager determines if the communication protocol is compatible with WAF protection. A communication protocol is compatible with WAF protection if the communication protocol can support filtering and analysis of web-based traffic offered by a WAF. Supported communication protocols which are compatible with WAF protection include HTTP and HTTPS, for example. The WAF configuration manager may maintain a list, policy, etc. indicating supported communication protocols that are compatible with WAF protection based on which to evaluate the determined communication protocol. If the communication protocol is not compatible with WAF protection, operations continue at block 306. If the communication protocol is compatible with WAF protection, operations continue at block 311.

At block 311, the WAF configuration manager instantiates a WAF for the cloud application in front of the exposed container. The WAF can be instantiated via an agent on which the WAF configuration manager executes, such as by enabling firewall protections for the container via the agent. The WAF configuration manager may first communicate a request for permission to instantiate the WAF for the identified container (e.g., to an administrator) and await confirmation before WAF protections are applied. In other implementations, the WAF configuration manager may have been initially configured with permissions allowing WAF instantiation for cloud applications upon identification of an unprotected container, such as based on an administrator marking the WAF configuration manager as a trusted entity. As part of instantiating the WAF, one or more iptables rules can be established so that traffic destined for the cloud application will be redirected to the agent for inspection by the WAF. The WAF may be instantiated with a default configuration comprising first set of signatures for which the WAF should monitor.

At block 313, the WAF configuration manager configures the WAF based on characteristics of the cloud application. The WAF configuration manager may determine one or more signatures to enable and/or policies to apply for the WAF based on characteristics of the cloud application, such as information pertaining to contents of the cloud application (e.g., type and/or known vulnerabilities of the cloud application), topology of the application (e.g., the topology of the application indicated by the network topology information obtained at block 303), etc. For instance, the WAF configuration manager can evaluate the characteristics of the cloud application against one or more rules, policies, etc. for determining the signatures and/or policies to enable for the WAF to secure the cloud application. Alternatively or in addition, rules or policies maintained by the WAF configuration manager can be defined for an organization, namespace, etc. which indicate a set of protections to apply for cloud applications associated with that organization or namespace. The WAF configuration manger can then determine the organization or namespace to which the cloud application belongs (e.g., based on application metadata) and enable the corresponding protections. The determined protections can be enabled for the WAF based on modifying the WAF configuration, applying one or more firewall rules or policies enforced by the WAF, etc. Application based WAF configuration is described in further detail in reference to FIG. 4.

At block 314, the WAF configuration manager determines if additional exposed containers were identified. If exposed containers are remaining, operations continue at block 306. If there are no exposed containers remaining, operations are complete.

FIG. 4 depicts a flowchart with example operations for performing application based WAF configuration at runtime. The example operations assume that a WAF has been instantiated for a cloud application (e.g., as described in reference to FIG. 3).

At block 401, the WAF configuration manager retrieves topology information for the cloud application. The WAF configuration manager may retrieve the topology information from a cloud management interface, console, etc. which facilitates management of the cloud application deployment on a cloud cluster and monitors network traffic communicated to and within the cloud cluster. The topology information indicates connectivity of containers of which the cloud application is composed. For instance, the topology information can comprise a directed graph indicating flow of network traffic between containers and other components (e.g., databases) of or used by the cloud application.

At block 403, the WAF configuration manager determines one or more additional characteristics of the cloud application. The additional characteristics of the cloud application can include characteristics that are related to or indicative of the cloud application type, a programming language of the cloud application, services or programs used or accessed by the cloud application (e.g., a relational database management system), a version of the cloud application, third party dependencies used by the cloud application (e.g., installed third party packages), and/or cloud application configuration data, for example. The WAF configuration manager can evaluate data collected by an agent on which the WAF configuration manager executes and/or other data/metadata about the cloud application that are accessible to the WAF configuration manager and infer characteristics pertaining to a type of the cloud application from the collected data/metadata. The additional characteristics of the cloud application that are determined can influence configuration of the WAF to provide an optimal set of protections that is tailored to the cloud application.

At block 405, the WAF configuration manager evaluates the determined characteristics of the cloud application. The WAF configuration manager can evaluate the determined characteristics based on WAF configuration rules or policies to inform a determination of whether the WAF should monitor for additional threats corresponding to additional signatures to be enabled or policies to be applied and/or if any protections are not applicable for the cloud application and should thus remain disabled for the WAF. The WAF configuration rules or policies against which the cloud application characteristics are evaluated may indicate signatures corresponding to security threats for which the WAF can be configured to monitor and conditions for enabling the signatures in the WAF configuration which may be satisfied by characteristics of the cloud application. For instance, the WAF configuration manager can evaluate a determined programming language of the cloud application against the configuration rules or policies to determine if any signatures specific to the programming language should be enabled for the WAF. The WAF configuration manager may also obtain a list of known vulnerabilities of the cloud application (e.g., vulnerability data obtained from a cloud management console) and evaluate the identified vulnerabilities against the WAF configuration rules or policies to determine if any of the vulnerabilities correspond to protections that can be enabled for the WAF.

At block 406, the WAF configuration manager determines whether one or more additional protections are to be enabled for the WAF. The WAF configuration manager can determine if additional WAF protections should be enabled based on results of the evaluation of the cloud application characteristics. For instance, the WAF may have been enabled with a default set of protections. The WAF configuration manager can then determine if additional protections should be enabled based on whether at least a first of the WAF configuration rules/policies was satisfied by the cloud application characteristic(s) and, if so, identify the corresponding protection(s) to enable. Alternatively, the WAF configuration manager may determine that cloud application characteristics do not satisfy any WAF configuration rules/policies and the protections disabled by default need not be enabled for effectively securing the cloud application. If additional protections are to be enabled, operations continue at block 407. If no additional protections should be enabled, operations are complete.

At block 407, the WAF configuration manager enables one or more protections for the WAF in the WAF configuration based on the evaluation. The protections which the WAF configuration manager determines to enable include those corresponding to the WAF configuration rules or policies which were satisfied by the characteristics of the cloud application. For instance, if the cloud application type information indicates that the cloud application uses a relational database management system and a configuration rule/policy denotes that protection against SQL injection should be applied if an application uses relational database management systems, the WAF configuration manager can determine that signatures and/or policies related to SQL injection should be enabled for the WAF. The WAF configuration manager can enable the determined protections by modifying a configuration of the WAF, by applying one or more firewall rules or policies, etc.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 301 and 303 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
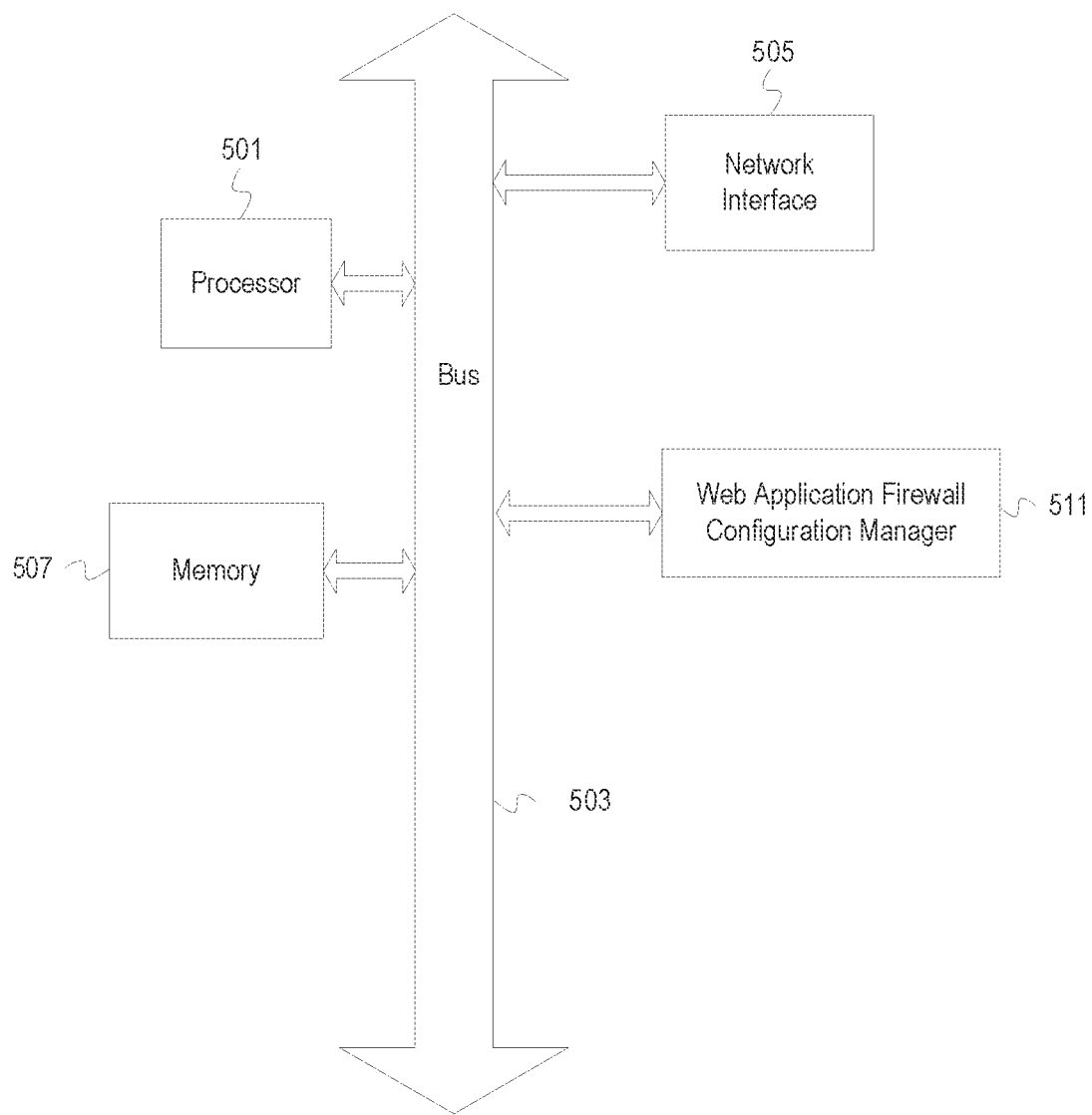
FIG. 5 depicts an example computer system with a WAF configuration manager.

FIG. 5 depicts an example computer system with a WAF configuration manager. The computer system includes a processor 501 (possibly including multiple processors, multiple cores, multiple nodes, and/or implementing multithreading, etc.). The computer system includes memory 507. The memory 507 may be system memory or any one or more of the above already described possible realizations of machine-readable media. The computer system also includes a bus 503 and a network interface 505. The system also includes WAF configuration manager 511. The WAF configuration manager 511 determines whether to instantiate a WAF for a cloud application and, if enabled, dynamically determines where to instantiate the WAF and configures the WAF based on characteristics of the cloud application being secured. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for automated deployment and configuration of a WAF to secure a cloud application as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/manage by the cloud service provider entity that is accessible via network connections. Often, the access is in accordance with an application programming interface or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    identifying one or more containers of a cloud application deployed to a cloud cluster that are exposed external to the cloud cluster;
    determining a first container of the one or more containers in front of which to instantiate a web application firewall for the cloud application;
    instantiating a web application firewall in front of the first container with a default configuration, wherein the default configuration comprises one or more protections enabled for the web application firewall;
    determining if any protections of the web application firewall should be enabled in addition to those of the default configuration based on characteristics of the cloud application; and
    based on determining that one or more additional protections should be enabled for the web application firewall based on the characteristics of the cloud application, enabling the one or more additional protections for the web application firewall.

2. The method of claim 1, wherein determining if any protections of the web application firewall should be enabled in addition to those of the default configuration comprises evaluating the characteristics of the cloud application against a plurality of rules for enabling a corresponding plurality of protections offered by the web application firewall, and wherein enabling the one or more additional protections comprises, based on determining that the characteristics satisfy one or more rules of the plurality of rules, enabling the one or more protections that correspond to the one or more rules for the web application firewall.

3. The method of claim 1, wherein identifying the one or more containers comprises identifying containers deployed to the cloud cluster that are exposed to a load balancer that distributes traffic across the cloud cluster.

4. The method of claim 1, wherein identifying the one or more containers that are exposed external to the cloud cluster comprises identifying the one or more containers based on at least one of network topology information obtained for the cloud cluster and a configuration of the cloud cluster.

5. The method of claim 1 further comprising determining communication protocols used for communicating requests to each of the one or more containers, wherein determining the first container in front of which to instantiate the web application firewall comprises determining that a communication protocol that is compatible with web application firewall protection is used for communicating requests to the first container.

6. The method of claim 5, wherein determining that a communication protocol that is compatible with web application firewall protection is used for communicating requests to the first container comprises determining that Hypertext Transfer Protocol (HTTP) or Hypertext Transfer Protocol Secure (HTTPS) is used for communicating requests to the first container.

7. The method of claim 1, wherein enabling the one or more additional protections of the web application firewall comprises configuring the web application firewall to enable at least one of a signature for which the web application firewall is to monitor and a policy the web application firewall is to apply.

8. The method of claim 1 further comprising:
    determining a first protection of the one or more protections enabled in the default configuration to disable for the web application firewall based on the characteristics of the cloud application; and
    disabling the first protection for the web application firewall.

9. One or more non-transitory machine-readable media having program code stored thereon, the program code comprising instructions that are executable by a processor to cause the processor to:
    identify one or more containers of a cloud application that are exposed external to a cloud cluster on which the cloud application executes;

determine whether any of the one or more containers are compatible with web application firewall protection;

based on a determination that a first container of the one or more containers is compatible with web application firewall protection, instantiate a web application firewall in front of the first container with a default set of protections enabled;

determine one or more additional protections to enable for the web application firewall based on characteristics of the cloud application, wherein the one or more additional protections are protections in addition to those of the default set of protections; and enable the one or more additional protections for the web application firewall.

10. The non-transitory machine-readable media of claim 9, wherein the program code further comprises instructions to determine a first protection of the default set of protections to disable for the web application firewall based on the characteristics of the cloud application and disable the first protection.

11. The non-transitory machine-readable media of claim 9, wherein the program code further comprises instructions to determine communication protocols used for communicating requests to the one or more containers, and wherein the instructions to determine whether any of the one or more containers are compatible with web application firewall protection comprise instructions to determine whether Hypertext Transfer Protocol (HTTP) or Hypertext Transfer Protocol Secure (HTTPS) are used for communicating requests to any of the one or more containers.

12. The non-transitory machine-readable media of claim 9, wherein the instructions to identify the one or more containers of the cloud application that are exposed external to the cloud cluster comprise at least one of:

instructions to identify containers deployed to the cloud cluster that are exposed to a load balancer that distributes traffic across the cloud cluster, wherein the one or more containers are exposed to the load balancer, instructions to identify the one or more containers based on network topology information obtained for the cloud cluster, and instructions to identify the one or more containers based on a configuration of the cloud cluster.

13. The non-transitory machine-readable media of claim 9, wherein the instructions to determine the one or more additional protections to enable for the web application firewall comprise instructions to evaluate the characteristics of the cloud application against a plurality of rules for enabling a corresponding plurality of protections offered by the web application firewall, and wherein the instructions to enable the one or more additional protections comprise instructions to, based on a determination that the characteristics satisfy one or more rules of the plurality of rules, enable the one or protections that correspond to the one or more rules for the web application firewall.

14. An apparatus comprising:

a processor; and a non-transitory computer-readable medium having instructions stored thereon that are executable by the processor to cause the apparatus to:

identify one or more containers of a cloud application deployed to a cloud cluster that are exposed external to the cloud cluster;

determine a first container of the one or more containers in front of which to instantiate a web application firewall for the cloud application;

instantiate a web application firewall in front of the first container with a default set of protections enabled;

determine one or more additional protections to enable for the web application firewall based on characteristics of the cloud application, wherein the one or more additional protections are protections in addition to those of the default set of protections; and enable the one or more additional protections for the web application firewall.

15. The apparatus of claim 14, wherein the instructions executable by the processor to cause the apparatus to determine the one or more additional protections to enable for the web application firewall comprise instructions executable by the processor to cause the apparatus to evaluate the characteristics of the cloud application against a plurality of rules for enabling a corresponding plurality of protections offered by the web application firewall, and wherein the instructions executable by the processor to cause the apparatus to enable the one or more additional protections comprise instructions executable by the processor to cause the apparatus to, based on a determination that the characteristics satisfy one or more rules of the plurality of rules, enable the one or protections that correspond to the one or more rules for the web application firewall.

16. The apparatus of claim 14, wherein the instructions executable by the processor to cause the apparatus to identify the one or more containers that are exposed external to the cloud cluster comprise instructions executable by the processor to cause the apparatus to identify containers deployed to the cloud cluster that are exposed to a load balancer that distributes traffic across the cloud cluster, wherein the one or more containers are exposed to the load balancer.

17. The apparatus of claim 14, wherein the instructions executable by the processor to cause the apparatus to identify the one or more containers that are exposed external to the cloud cluster comprise instructions executable by the processor to cause the apparatus to identify the one or more containers based on at least one of network topology information obtained for the cloud cluster and a configuration of the cloud cluster.

18. The apparatus of claim 14 further comprising instructions executable by the processor to cause the apparatus to determine communication protocols used for communicating requests to each of the one or more containers, wherein the instructions executable by the processor to cause the apparatus to determine the first container in front of which to instantiate the web application firewall comprise instructions executable by the processor to cause the apparatus to determine that a communication protocol that is compatible with web application firewall protection is used for communicating requests to the first container.

19. The apparatus of claim 18, wherein the instructions executable by the processor to cause the apparatus to determine that a communication protocol that is compatible with web application firewall protection is used for communicating requests to the first container comprise instructions executable by the processor to cause the apparatus to determine that Hypertext Transfer Protocol (HTTP) or Hypertext Transfer Protocol Secure (HTTPS) is used for communicating requests to the first container.

\* \* \* \* \*